(12) United States Patent
Sheppard et al.

(10) Patent No.: US 12,294,764 B2
(45) Date of Patent: May 6, 2025

(54) METHODS AND APPARATUS TO IDENTIFY INCONSISTENCIES IN AUDIENCE MEASUREMENT DATA

(71) Applicant: The Nielsen Company (US), LLC, New York, NY (US)

(72) Inventors: Michael Sheppard, Holland, MI (US); Edward Murphy, North Stonington, CT (US)

(73) Assignee: The Nielsen Company (US), LLC, New York, NY (US)

( * ) Notice: Subject to any disclaimer, the term of this patent is extended or adjusted under 35 U.S.C. 154(b) by 57 days.

(21) Appl. No.: 18/051,291

(22) Filed: Oct. 31, 2022

(65) Prior Publication Data
US 2024/0147007 A1    May 2, 2024

(51) Int. Cl.
*H04N 21/466*    (2011.01)
*H04N 21/258*    (2011.01)

(52) U.S. Cl.
CPC ... *H04N 21/4667* (2013.01); *H04N 21/25866* (2013.01)

(58) Field of Classification Search
CPC ......... H04N 21/4667; H04N 21/25866; H04N 21/44213; H04N 21/44222; H04N 21/44204

USPC .......................................................... 725/46
See application file for complete search history.

(56) References Cited

U.S. PATENT DOCUMENTS

| | | | |
|---|---|---|---|
| 2016/0269766 A1* | 9/2016 | Levande | H04N 21/6582 |
| 2018/0020251 A1* | 1/2018 | Hull | H04N 21/23406 |
| 2018/0249210 A1* | 8/2018 | Sheppard | H04N 21/44222 |
| 2019/0058917 A1* | 2/2019 | Orlowski | H04N 21/252 |
| 2019/0220873 A1* | 7/2019 | Sullivan | G06Q 30/0201 |
| 2021/0158377 A1* | 5/2021 | Sheppard | H04H 60/66 |
| 2023/0096891 A1* | 3/2023 | Tucker | H04N 21/251 725/34 |

\* cited by examiner

*Primary Examiner* — Cynthia M Fogg

(57) ABSTRACT

Methods, apparatus, systems, and articles of manufacture to identify inconsistencies in audience measurement data are disclosed. Example apparatus disclosed herein are to compare ones of a first set of cumulative audience metrics with one or more limits based on a second set of event-level audience metrics to detect an inconsistency in at least one of the first set of cumulative audience metrics or the second set of event-level audience metrics. Disclosed example apparatus are further to generate a report of the inconsistency in the at least one of the first set of event-level audience metrics or the second set of cumulative audience metrics.

20 Claims, 9 Drawing Sheets

| 502 { | EVENT # ----------------------> | 1 | 2 | 3 | 4 | 5 |
|---|---|---|---|---|---|---|
| 504 { | SET 1 (CUMULATIVE AUDIENCE METRICS) | 16 | 52 | 60 | 49 | 89 |
| | SET 2 (EVENT-LEVEL AUDIENCE METRICS) | 16 | 48 | 5 | 11 | 64 |

FIG. 5a

| 542 { | EVENT # ----------------------> | 1 | 2 | 3 | 4 | 5 |
|---|---|---|---|---|---|---|
| 544 { | SET 1 (CUMULATIVE AUDIENCE METRICS) | 16 | 51 | 52 | 55 | 142 |
| | SET 2 (EVENT-LEVEL AUDIENCE METRICS) | 16 | 48 | 5 | 11 | 64 |

FIG. 5b

METHODS AND APPARATUS TO IDENTIFY INCONSISTENCIES IN AUDIENCE MEASUREMENT DATA

FIELD OF THE DISCLOSURE

This disclosure relates generally to analyzing audience measurement data and, more particularly, to methods and apparatus to identify inconsistencies in audience measurement data.

BACKGROUND

A media monitoring entity may be interested in determining audience exposure to media. Traditionally, audience exposure to media is determined based on data recorded by registered panel members. In some examples, a media monitoring entity such as an audience measurement entity (AME) collects data, including audience metrics, to determine media exposed to those registered panel members. In some examples, the AME may collect data via additional or alternative means to try and determine audience exposure to media, including collecting estimated audience measurement data and/or estimating audience measurement data.

BRIEF DESCRIPTION OF THE DRAWINGS

FIG. 5A and FIG. 5B are tables including data representative of example audience measurement data which may be received, interpreted and/or verified by the audience metrics analyzer of FIG. 2 to identify an inconsistency.

In general, the same reference numbers will be used throughout the drawing(s) and accompanying written description to refer to the same or like parts. The figures are not to scale.

Figure 1:
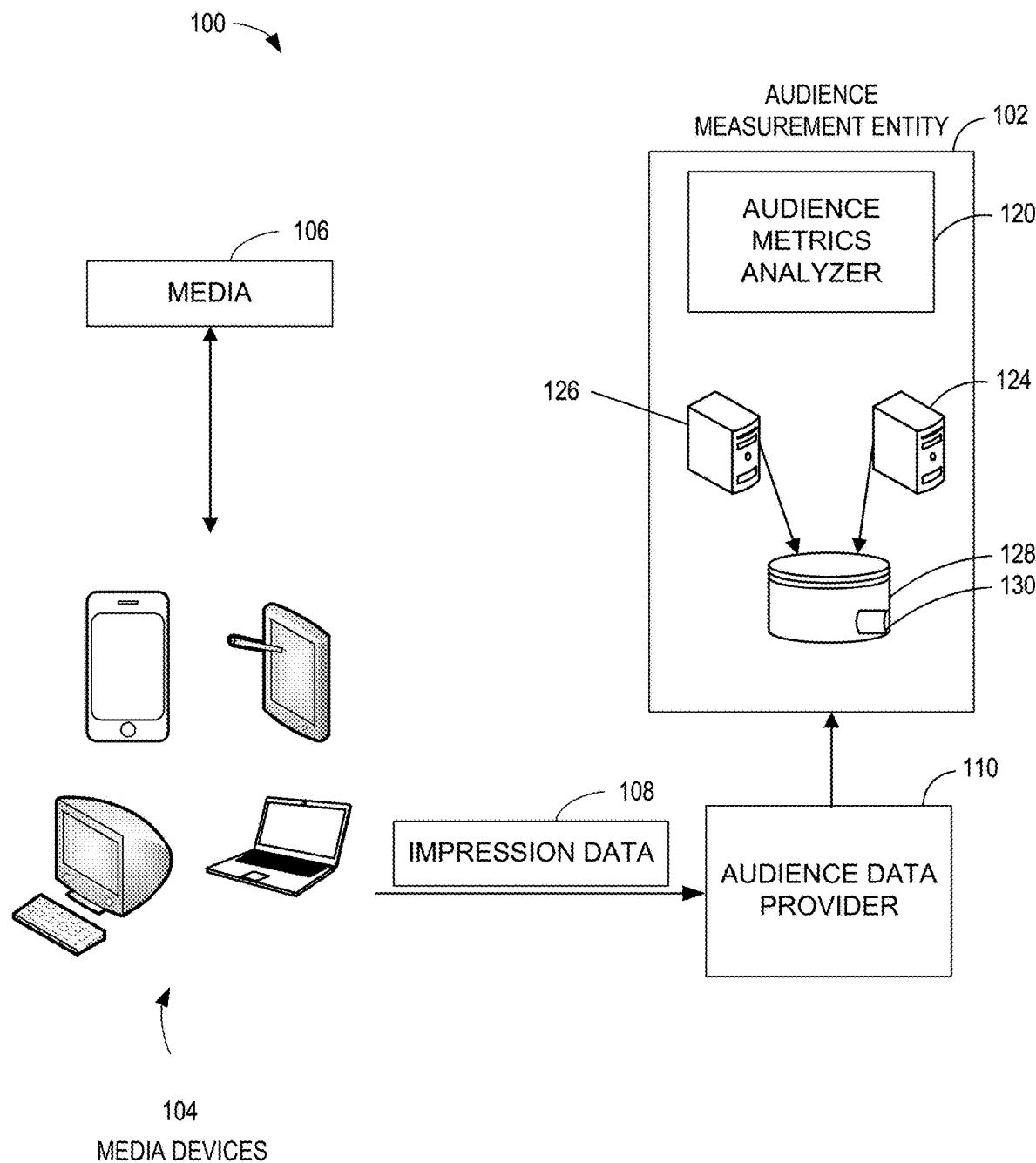
FIG. 1 is an example environment including an example audience metrics analyzer to identify inconsistencies in audience measurement data in accordance with teachings of this disclosure.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Providers of media (e.g., content, advertisers, advertisement campaigns, etc.) may be interested in determining an accurate count representative of a number of users accessing their media (e.g., the number of times the media is accessed). In some examples, this is accomplished by generating and/or otherwise identifying media data relating to the number of users accessing their media. In some examples, providers of media are also interested in the number of unique audience members accessing their media (e.g., an individual audience member who accesses the same media content multiple times is only one unique audience member accessing the media). In some examples, it may be useful to generate, provide, and/or receive an estimate of audience measurement data. In some examples, these estimates are provided, and may include metrics including a number of users accessing media at a series of events and/or intervals (e.g., event-level audience metrics, event-level audience measurement data, etc.), and/or metrics including a cumulative number of unique users having accessed media at the same series of events and/or intervals (e.g., cumulative audience metrics, cumulative audience measurement data, etc.).

In some examples, a media entity (e.g., a media provider, an audience measurement entity, etc.) and/or other party may be interested in verifying the consistency of audience measurement data. This audience measurement data may include data reported to the media entity, data collected by the media entity, estimated data collected by the media entity, data estimated by the media entity, etc. In some examples, verifying the consistency of audience measurement data can identify if the audience measurement data is feasible (e.g., the audience measurement data could possibly occur, etc.). In some examples, the media entity may be interested in verifying the consistency of third-party audience measurement data, third-party estimated audience measurement data, estimated audience measurement data, etc. As used herein, consistency of data could include if the data is reasonable, if the data is possible, etc.

In some examples, the audience measurement data may include media impressions corresponding respectively to a series of intervals (e.g., event-level audience measurement data) and/or media impressions accumulated over the same series of intervals representing a cumulative unique audience who have recorded impressions of the media (e.g., cumulative audience measurement data).

As used herein, an impression corresponds to an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or an advertisement campaign) has been accessed by a web population (e.g., the number of times the media is accessed). In some examples, an impression or media impression is logged by the monitoring entity in response to an impression request from a user/media device that requested the media. For example, an impression request is a message and/or communication (e.g., an HTTP request) sent by a client device to an impression collection server of the monitoring entity to report the occurrence of a media impression at the client device. In response, the impression collection server logs an impression in an impression record. Logged impression records based on impression requests are another example type of media data.

In examples disclosed herein, the monitoring entity, or entity reporting the audience measurement data, may be a neutral third-party audience measurement entity (AME) responsible for providing accurate media usage statistics (e.g., The Nielsen Company, LLC).

As used herein, a "set" describes a collection of data. The collection of data may include any number of related elements. In some examples, a set may include a collection of data representing event-level audience metrics. As used herein, an event-level audience metric may be data representing the number of media impressions at, or corresponding to, a given event. In some examples, these events are hours, days, weeks, months, years, or any other time interval which may represent a period of time between events of the set of event-level audience metrics. In some examples, the period of time between corresponding events of the set of event-level audience metrics may be constant (e.g., 24 hours between events) or variable (e.g., determined by an audience measurement entity, etc.). For example, a set of event-level audience measurement data may include a first event-level audience metric (e.g., with a value of 10 audience impressions or some other value) corresponding to a first event, a second event-level audience metric corresponding to a second event (e.g., with a value of 5 audience impressions or some other value), and a third event-level audience metric corresponding to a third event (e.g., with a value of 15 audience impressions or some other value). In this example, the event-level audience metrics represent the number of unique (e.g., deduplicated) audience impressions for their respective events. As used herein, a cumulative audience metric is data representing the cumulative number of unique media impressions recorded up to and including a given event. In some examples, a "unique media impression" represents only one unique media impression regardless of the number of media impressions made by a particular audience member in the interval of interest. Therefore, a given audience member is only attributed one unique media impression in a set of cumulative audience metrics regardless of the number of media impressions made by that given audience member in the set of events associated with the set of cumulative audience metrics. Therefore, event-level metrics provide counts of unique media impressions for an individual event, and cumulative metrics provide counts of unique impressions across a group of events.

As used herein, elements in a data set, including, for example, elements in a set of event-level audience metrics or elements in a set of cumulative audience metrics, may correspond to an initial event and/or a target event. As used herein, a target event and/or an initial event is an event represented by data in a set of event-level audience metrics and corresponding data in a set of cumulative audience metrics.

As used herein, a universe audience estimate of a population may be an estimate of a total audience that could be exposed to and/or record impressions of accesses to a particular media.

FIG. 1 is an example environment 100 including an example audience measurement entity 102. The example environment 100 includes example media devices 104. In examples disclosed herein, the media devices 104 can deliver example media 106 to audience members. When the media 106 is accessed by the media devices 104, the media devices 104 send example impression data 108 to an example audience data provider 110. In some examples, the impression data may be sent and/or collected directly by the audience measurement entity 102. In this way, the audience measurement entity 102 receives or collects audience measurement data. In some examples, the audience measurement entity 102 may generate estimated audience measurement data or may receive estimated audience measurement data from the audience data provider 110.

The example media devices 104 may be stationary computers, portable computers, handheld computing devices, Internet appliances, smart phones, smart televisions, and/or any other type of device that may be capable of connecting to the Internet and/or otherwise capable of accessing and/or presenting media.

As used herein, an audience size is defined as a number of audience members exposed to a media item of interest for audience metrics analysis. In some examples, an audience size is a unique audience size (without duplicates) that represents a count of unique individuals counted only once regardless of the number of times a given individual accessed the media item. In some examples, a media impression is defined as an occurrence of access and/or exposure to media 106 (e.g., an advertisement, a movie, a movie trailer, a song, a web page banner, etc.). Examples disclosed herein may be used to identify inconsistencies in audience measurement data for media impressions of any one or more media types (e.g., audio, video, an image, a web page, text, etc.). Examples disclosed herein are not restricted for use with any particular type of media, media device, access technology, etc.

The media 106 may be any source of media for which an impression is recorded on the media devices 104 (e.g., an advertisement, a movie, a movie trailer, a song, a web page banner, etc.). Examples disclosed herein may include impressions recorded for any one or more media types (e.g., video, audio, a web page, an image, text, etc.).

In some examples, the example impression data 108 is collected based on beacon requests from tagged media. For example, the media 106 may be tagged or encoded to include monitoring or tag instructions, which are computer executable monitoring instructions (e.g., Java, java script, or any other computer language or script) that are executed by web browsers that access the media 106 via, for example, the Internet. Execution of the monitoring instructions causes the web browser to send the impression data 108 (e.g., also referred to as tag requests) to one or more specified servers of the audience measurement entity 102. As used herein, a tag request may be used by the media devices 104 to report occurrences of media impressions caused by the media devices 104 accessing the media 106. In the illustrated example, the impression data 108 may include user identifying information that the audience data provider 110 and/or audience measurement entity 102 can use to identify an audience member (e.g., a user) that accessed the media 106. In some examples, additional or alternative techniques for collecting media impression data 108 may be used. For example, server logs may be used to log media impressions in response to HTTP requests for media received from client devices. The impressions can be logged by the server in association with user/subscriber demographics based on user/device identifying information in the requests for media. In some examples where the media 106 is accessed by apps on mobile devices, tablets, computers, etc. (e.g., that do not employ cookies and/or do not execute instructions in a web browser environment), media impression data 108 may be collected by a server based on network communications.

The example audience data provider 110 may be responsible for providing audience estimate information to the audience measurement entity 102. In some examples, the audience data provider 110 does not collect media impression data 108 representative of a full media audience or may collect a subset of media impression data 108 from a limited portion of an audience. In these examples, the audience data provider 110 may provide estimated audience measurement data to the audience measurement entity 102 based on the subset of collected media impression data 108. In some examples, the audience data provider 110 may estimate audience measurement data based on no collected media impression data 108 (e.g., the audience measurement data collected by the audience measurement entity 102 may be estimated audience measurement data). In some examples, the audience measurement entity 102 estimates audience measurement data.

The example environment 100 of FIG. 1 includes an example audience metrics analyzer 120 configured to, responsive to the audience measurement entity 102 receiving and/or generating audience measurement data, analyze the audience measurement data to identify inconsistencies in the audience measurement data. The audience metrics analyzer 120 may communicate with any number of example computers, servers, storage, etc. of the audience measurement entity 102. In some examples, the audience measurement entity 102 includes an example server 124 and/or an example computer 126 responsible for facilitating network communications. These network communications may include any communications sent and/or received by the audience measurement entity 102, including receiving audience measurement data (e.g., from the audience data provider 110), and/or receiving impression data 108 (e.g., from the media devices 104). The audience measurement entity may include storage 128 and example storage partition 130 responsible for storing audience measurement data, including estimated audience measurement data, and may be responsible for storing machine readable instructions to be executed by the audience metrics analyzer 120, or, more generally, the audience measurement entity 102. While in the depicted example environment of FIG. 1, there is only an example server 124, an example computer 126, an example storage 128, and an example storage partition 130, in other examples there may be in any number, composition, etc., of these components (e.g., there may be more of one, or some other component may perform the same function to store data, instructions, facilitate communications, etc.).

Figure 2:
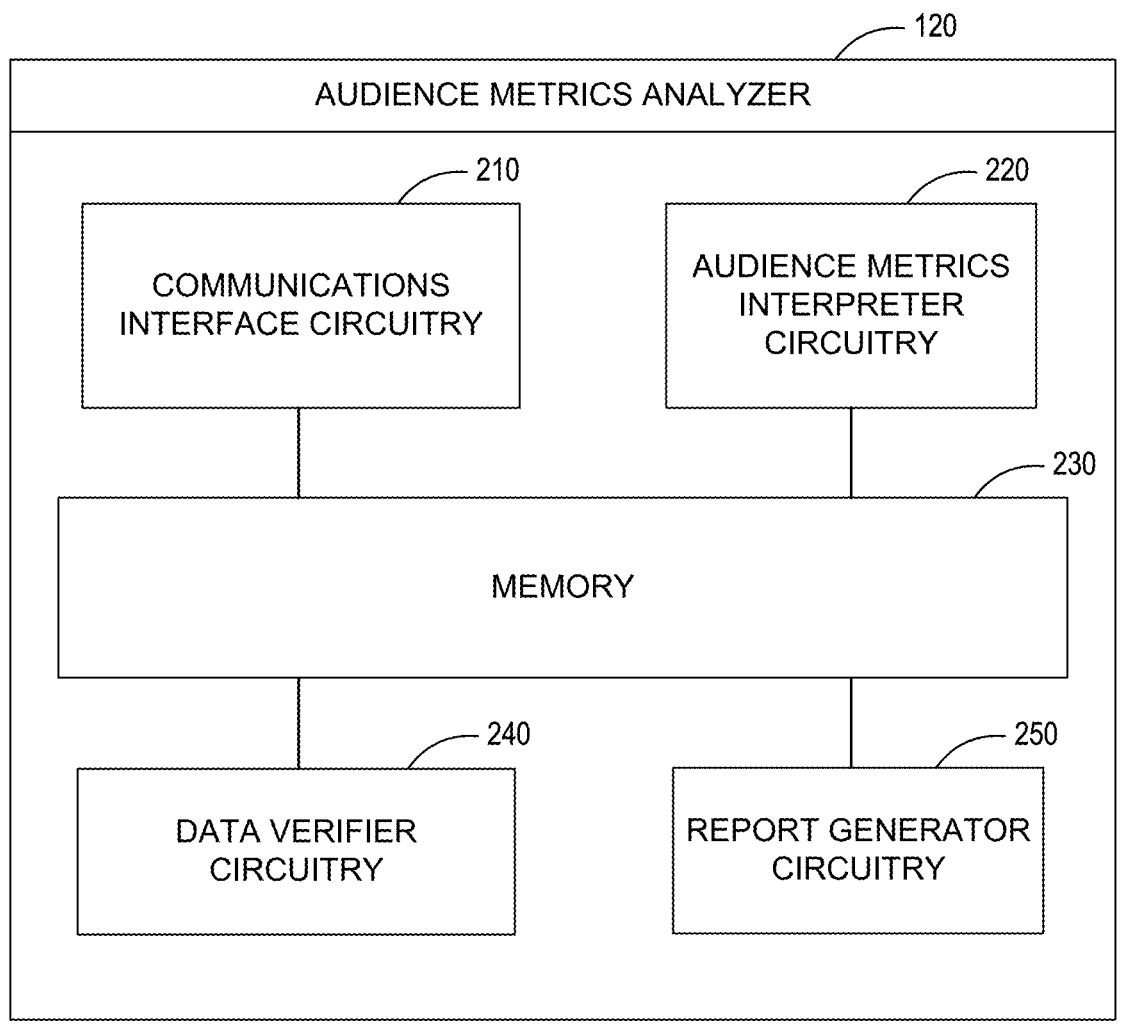
FIG. 2 is a block diagram of the example audience metrics analyzer of FIG. 1.

FIG. 2 is an example block diagram of the audience metrics analyzer 120 of FIG. 1. In FIG. 2, the audience metrics analyzer 120 includes example communications interface circuitry 210, example audience metrics interpreter circuitry 220, example memory 230, example data verifier circuitry 240, and example report generator circuitry 250. Additionally or alternatively, the example audience metrics analyzer 120 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In FIG. 2, the communications interface circuitry 210 communicates with any internal or external information source to receive and send information, including, in some examples, audience monitoring data, including event-level audience measurement data and cumulative audience measurement data. This data may consist of audience measurement metrics which are in a form that can be processed by the audience metrics analyzer 120, including the audience metrics interpreter circuitry 220, the memory 230, the data verifier circuitry 240, and the report generator circuitry 250, and may be stored, retrieved, sent, etc. to and from the example memory 230. In some examples, the communications interface circuitry 210 receives audience measurement data from the audience data provider 110 and it is in a format not processable by the data verifier circuitry 240. In such examples, the audience measurement data may be sent to the audience metrics interpreter circuitry 220 to convert it into data that can be processed by the audience measurement entity, including the data verifier circuitry 240. This may include receiving data from the audience data provider 110 in any format and converting the data into a form interpretable by any of the audience metrics interpreter circuitry 220, the data verifier circuitry 240, and/or the report generator circuitry 250.

In some examples, the communications interface circuitry 210 includes means for communicating. For example, the means for communicating may be implemented by the example communications interface circuitry 210. In some examples, the communications interface circuitry 210 may be instantiated by processor circuitry such as the example processor circuitry 612 of FIG. 6. For instance, the communications interface circuitry 210 may be instantiated by the example microprocessor 600 of FIG. 6 executing machine executable instructions such as those implemented by at least block 310 of FIG. 3. In some examples, the communications interface circuitry 210 may be instantiated by hardware logic circuitry, which may be implemented by an ASIC, XPU, or the FPGA circuitry 800 of FIG. 8 structured to perform operations corresponding to the machine readable instructions. Additionally or alternatively, the communications interface circuitry 210 may be instantiated by any other combination of hardware, software, and/or firmware. For example, the communications interface circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example audience metrics interpreter circuitry 220 converts audience measurement data into data processable by the data verifier circuitry 240. This may include processing the data into any number of sets of event-level audience measurement data and/or any number of sets of cumulative audience measurement data, as described below.

In some examples, the audience metrics interpreter circuitry 220 includes means for interpreting. For example, the means for interpreting may be implemented by example audience metrics interpreter circuitry 220. In some examples, the audience metrics interpreter circuitry 220 may be instantiated by processor circuitry such as the example processor circuitry 612 of FIG. 6. For instance, the audience metrics interpreter circuitry 220 may be instantiated by the example microprocessor 600 of FIG. 6 executing machine executable instructions such as those implemented by at least block 310 of FIG. 3. In some examples, the audience metrics interpreter circuitry 220 may be instantiated by hardware logic circuitry, which may be implemented by an ASIC, XPU, or the FPGA circuitry 800 of FIG. 8 structured to perform operations corresponding to the machine readable instructions. Additionally or alternatively, the audience metrics interpreter circuitry 220 may be instantiated by any other combination of hardware, software, and/or firmware. For example, the audience metrics interpreter circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example, the example memory 230 may store instructions, settings, data, and/or any other information relevant to this disclosure. In some examples, a report detailing inconsistencies is stored in the example memory 230. The example memory 230 may store the results of tests performed on the audience measurement data to be sent to an outside entity or interpretable in human-readable form.

In the illustrated example, the data verifier circuitry 240 verifies the audience measurement data by performing a series of tests on the audience measurement data to identify inconsistencies. In some examples, these tests are stored and/or received by any of the example computer 126 and/or example storage 128 of the example audience measurement entity 102. In some examples, these tests include a set of tests based on criteria for verifying consistency of the audience measurement data, as described below.

In some examples, the data verifier circuitry 240 evaluates two conditions, identified as condition 1 and condition 2 herein, as a basis for a series of tests to perform on the audience measurement data to identify inconsistencies. Conditions 1 and 2 use the following expressions and variables:

$S_n$ is a set of cumulative audience metrics including n elements corresponding to n events;

$A_n$ is a cumulative audience across the set $S_n$, from an initial event (e.g., n=1) up to and including a given event n of the set;

$a_n$ is an event-level metric at event n; and

U is a universe estimate of a population.

Given the preceding variables, a first condition (e.g., condition 1) evaluated by the data verifier circuitry 240 to verify the consistency of audience measurement data is given by:

$$\text{Max}(S_n) \leq A_n \leq \text{Min}(\text{Sum}(S_n), U) \quad \text{Condition 1}$$

Condition 1 specifies that a given cumulative audience metric corresponding to a given target event cannot be less than any of the event-level metrics from the initial event to the target event corresponding to that cumulative audience metric. Condition 1 also specifies that neither a sum of the event-level metrics from the initial event to the target event corresponding to the given cumulative audience metric, nor a universe estimate of the audience population, can be less than the cumulative audience metric corresponding to the target event.

In examples where the audience metrics are in proportions of the populations, then U=1 (for 100%) and the first condition is similar to the Fréchet inequality for a union of sets. In other examples, U can be the raw value for the universe estimate of population under study.

Given the preceding variables, a second condition (e.g., condition 2) evaluated by the data verifier circuitry 240 to verify the consistency of audience measurement data is given by:

$$0 \leq A_n - A_{(n-1)} \leq a_n \quad \text{Condition 2}$$

Condition 2 specifies that the difference between $A_n$ and $A_{(n-1)}$ is to lie between 0 and $a_n$ inclusive to be consistent. Condition 2 also specifies that cumulative unique audience should not decrease throughout cumulative audience metrics corresponding to a series of events, and that adding a new day's audience, including event-level data regarding media impressions recorded to a particular media, can only increase the total unique audience or keep it the same. The two extremes of criteria 2 are if all $a_n$ individuals are either i) members of the audience previously, which would mean there would be no change in the unique audience, or ii) all new audience members are unique have not previously recorded impressions in the set of audience data.

In some examples, the data verifier circuitry 240 includes means for verifying. For example, the means for verifying may be implemented by example data verifier circuitry 240. In some examples, the data verifier circuitry 240 may be instantiated by processor circuitry such as the example processor circuitry 612 of FIG. 6. For instance, the data verifier circuitry 240 may be instantiated by the example microprocessor 600 of FIG. 6 executing machine executable instructions such as those implemented by at least block 320 of FIG. 3 and/or blocks 405, 410, 420, 430, 440, 450, 460, and/or 470 of FIG. 4. In some examples, the data verifier circuitry 240 may be instantiated by hardware logic circuitry, which may be implemented by an ASIC, XPU, or the FPGA circuitry 800 of FIG. 8 structured to perform operations corresponding to the machine readable instructions. Additionally or alternatively, the data verifier circuitry 240 may be instantiated by any other combination of hardware, software, and/or firmware. For example, the data verifier circuitry 240 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example report generator circuitry 250 creates and/or sends any reports in accordance with the teachings of this disclosure. In some examples, the report generator circuitry 250 is to process the data in accordance with a set of guidelines for tests that may be stored in the example memory 230. In some examples, the report generator circuitry 250, upon receiving data of the results of the tests performed on the audience measurement data, may complete a report and store the example report in the example memory 230. The example memory 230 may store the results of the tests performed on the audience measurement data to be sent to an outside entity or interpretable in human-readable form.

In some examples, the data verifier circuitry 240 and/or the report generator circuitry 250 trigger an alarm and/or warning via the communications interface circuitry 210 to indicate a detected inconsistency. In some examples, this alarm and/or warning is displayed or sounded from the example computer 126. In some examples, the warning is communicated by the communications interface circuitry 210 to a party interested in detecting an inconsistency in the audience measurement data. For example, such communication can be via email, SMS message, mobile application notification, automated phone call, etc., or any combination thereof. In some examples, this communication includes details regarding the nature of the detected inconsistency. In some examples, example messages to be communicated, including messages indicating a detected inconsistency or no detected inconsistency, are stored by the memory 230 and referenced by the communications interface circuitry 210 to be sent to an interested party.

In some examples, the communications interface circuitry 210, the data verifier circuitry 240 and/or the report generator circuitry 250 instructs and/or causes a downstream process to stop processing data. In some examples, this data is audience measurement data. In some examples, the data verifier circuitry 240 and/or the report generator circuitry 250 cause the communications interface circuitry 210 to send a message or assert a trigger for a process (e.g., a trigger is sent to the audience data provider 110 to stop collecting, estimating, or otherwise processing audience measurement data in response to detecting an inconsistency). In some examples, the trigger to stop processing data in response to detecting an inconsistency is to preserve computing resources. In the example including the trigger sent to the audience data provider 110, this could allow the audience data provider 110 to increase computing efficiency with other tasks, including collecting and/or estimating other data sets.

In some examples, the report generator circuitry 250 includes means for generating. For example, the means for generating may be implemented by example report generator circuitry 250. In some examples, the report generator circuitry 250 may be instantiated by processor circuitry such as the example processor circuitry 612 of FIG. 6. For instance, the report generator circuitry 250 may be instantiated by the example microprocessor 600 of FIG. 6 executing machine executable instructions such as those implemented by at least block 330 of FIG. 3. In some examples, the report generator circuitry 250 may be instantiated by hardware logic circuitry, which may be implemented by an ASIC, XPU, or the FPGA circuitry 800 of FIG. 8 structured to perform operations corresponding to the machine readable instructions. Additionally or alternatively, the report generator circuitry 250 may be instantiated by any other combination of hardware, software, and/or firmware. For example, the report generator circuitry 250 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While in the depicted examples, the storage 128, example storage partition 130, and memory 230 are depicted as separate entities, in reality, these entities are only representative of storage and/or memory accessible by the audience measurement entity and may be in any configuration required in order to complete the examples of this invention.

Although examples disclosed herein are described in association with audience metrics related to media impressions, examples disclosed herein may be similarly used for other applications to identify inconsistencies of a set of data.

The datasets themselves need not be media impressions. They could be, for example, demographic information, bank accounts, lists of purchased items, store visits, traffic patterns, and/or any other sets of data associated with data corresponding to time intervals. The datasets could be represented as lists of numbers or any other information.

While an example manner of implementing the audience metrics analyzer 120 of FIG. 1 is illustrated in FIG. 2, one or more of the elements, processes, and/or devices illustrated in FIG. 2 may be combined, divided, re-arranged, omitted, eliminated, and/or implemented in any other way. Further, the example communications interface circuitry 210, the example audience metrics interpreter circuitry 220, the example memory 230, the example data verifier circuitry 240, the example report generator circuitry 250, and/or, more generally, the example audience metrics analyzer 120 of FIG. 1, may be implemented by hardware alone or by hardware in combination with software and/or firmware. Thus, for example, any of the example communications interface circuitry 210, the example audience metrics interpreter circuitry 220, the example memory 230, the example data verifier circuitry 240, the example report generator circuitry 250, and/or, more generally, the example audience metrics analyzer 120 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example audience metrics analyzer 120 of FIG. 1 may include one or more elements, processes, and/or devices in addition to, or instead of, those illustrated in FIG. 2, and/or may include more than one of any or all of the illustrated elements, processes and devices.

Figure 3:
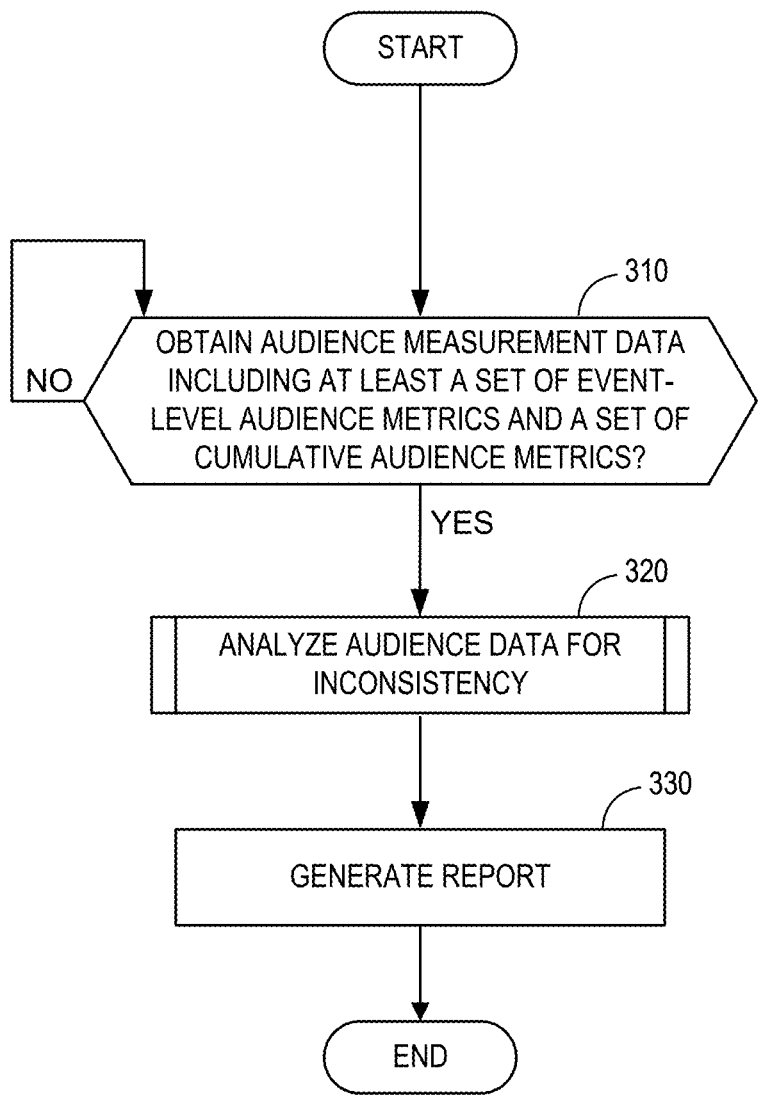
FIG. 3 is a flowchart representative of example machine readable instructions and/or example operations which may be executed by example processor circuitry to implement the audience metrics analyzer of FIG. 2.
Figure 4:
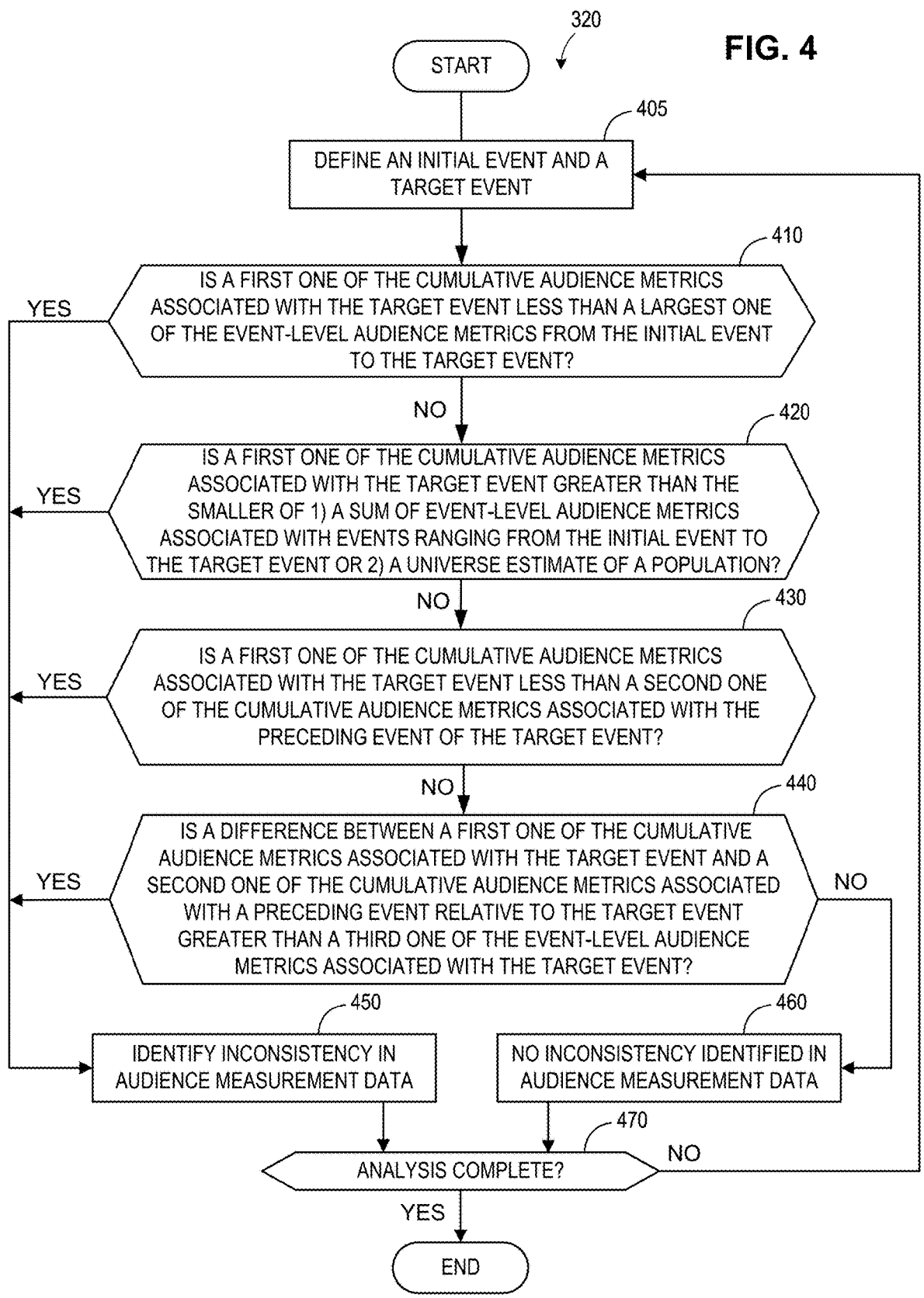
FIG. 4 is a flowchart representative of example machine readable instructions and/or example operations which may be executed by example processor circuitry to analyze audience measurement data and to identify inconsistencies in audience measurement data with the audience metrics analyzer of FIG. 2.

Flowcharts representative of example machine readable instructions, which may be executed to configure processor circuitry to implement the audience metrics analyzer 120 of FIG. 2, are shown in FIGS. 3 and 4. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3 and 4, many other methods of implementing the example audience metrics analyzer 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3 and/or 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to implement the audience metrics analyzer 120 to identify inconsistencies in audience measurement data. The machine readable instructions and/or example operations 300 of FIG. 3 begin at block 310, at which the example audience metrics analyzer 120 obtains audience measurement data. In some examples, the audience metrics analyzer 120 obtains audience measurement data via the example communications interface circuitry 210. In some examples, the communications interface circuitry 210 transmits and receives messages and data, including from the audience data provider 110, including audience measurement data.

In response to obtaining audience measurement data, the example communications interface circuitry 210 of the example audience metrics analyzer 120 determines if the audience data contains at least a set of event-level audience metrics and a set of cumulative audience metrics. (Block 310). For example, an example set of event-level audience metrics includes at least one event-level audience metric, with each of the event-level audience metrics representative of a number of unique media impressions associated with a corresponding event in a set of events. An example set of cumulative audience metrics includes at least one cumulative audience metric, each cumulative audience metric representative of a cumulative unique audience from an initial event to a target event corresponding to the given cumulative audience metric. For example, an example set of event-level audience metrics may include event-level audience metrics corresponding to three events, namely, a first event, a second event, and a third event. In this example, an example set of cumulative audience metrics includes cumulative audience metrics corresponding to the same three events, namely, the first event, the second event, and the third event. In some examples, the audience measurement data obtained via the communications interface circuitry 210 may be sent to the audience metrics interpreter circuitry 220 to convert it into data that can be processed by the audience measurement entity. In some examples, the communications interface circuitry 210 retrieves data and identifies the data as including event-level audience measurement data and cumulative audience measurement data. In some examples, the communications interface circuitry 210 may contain data that cannot be distinguished by the communications interface circuitry as event-level audience measurement data and cumulative audience measurement data. In this example, the data is processed by the audience metrics interpreter circuitry 220 to organize and process the data into a format processable by the communications interface circuitry 210 and/or data verifier circuitry 240.

If the audience measurement data is determined to include at least a set of event-level audience metrics and a set of cumulative audience metrics (e.g., block 310 returning a result of YES), the audience measurement data is analyzed for inconsistency. (Block 320). At block 320, the example data verifier circuitry 240 may perform at least one test, such as evaluation of conditions 1 and/or 2 described above, to identify an inconsistency or inconsistencies in the audience measurement data. For example, audience measurement data (e.g., event-level audience measurement data comprising media impressions over a set of events, cumulative audience data comprising cumulative unique audience over a set of events, etc.) may be included in the analysis for inconsistency completed by the data verifier circuitry 240. Example tests that may be performed by audience metrics analyzer 120 at block 320 to identify an inconsistency in the audience measurement data are described in further detail below in the context of the description of FIG. 4.

In response to analyzing audience data for inconsistency (block 320), a report is generated. (Block 330). At block 330, the example report generator circuitry 250 generates a report. In some examples, the report generator circuitry 250 generates a report including inconsistencies identified in the audience measurement data. These could include details about the nature of the inconsistency detected by the data verifier circuitry 240. In some examples, a report including inaccuracies identified by the example audience metrics analyzer is transmitted to an audience data provider 110. In some examples, a report including inaccuracies is received and/or transmitted by the audience measurement entity 102 and stored in example storage partition 130. In some examples, the example audience metrics analyzer 120 generates a report detailing no inaccuracies found by the example audience metrics analyzer 120.

In some examples, a detected inconsistency in the audience measurement data causes the data verifier circuitry 240 and/or the report generator circuitry 250 to trigger an alarm and/or warning via the communications interface circuitry 210 to indicate a detected inconsistency. In some examples, this alarm and/or warning is displayed or sounded from the example computer 126. In some examples, the warning is communicated by the communications interface circuitry 210 to a party interested in detecting an inconsistency in the audience measurement data. For example, such communication can be via email, SMS message, mobile application notification, automated phone call, etc., or any combination thereof. In some examples, this communication includes details regarding the nature of the detected inconsistency. In some examples, example messages to be communicated, including messages indicating a detected inconsistency or no detected inconsistency, are stored by the memory 230 and referenced by the communications interface circuitry 210 to be sent to an interested party.

In some examples, a detected inconsistency in the audience measurement data causes the data verifier circuitry 240 and/or report generator circuitry 250 to instruct and/or cause a downstream process to stop processing data. In some examples, this data is audience measurement data. In some examples, the data verifier circuitry 240 and/or the report generator circuitry 250 cause the communications interface circuitry 210 to send a message or assert a trigger for a process (e.g., a trigger is sent to the audience data provider 110 to stop collecting, estimating, or otherwise processing audience measurement data in response to detecting an inconsistency). In some examples, the trigger to stop processing data in response to detecting an inconsistency is to preserve computing resources. In the example including the trigger sent to the audience data provider 110, this could allow the audience data provider 110 to increase computing efficiency with other tasks, including collecting and/or estimating other data sets.

FIG. 4 is a flowchart representative of example machine readable instructions 320 that may be executed and/or instantiated by processor circuitry to implement the audience metrics analyzer 120 to analyze audience data at block 320 of FIG. 3. The machine readable instructions 320 of FIG. 4 begin at block 405, at which the data verifier circuitry 240 defines an initial event and a target event. In some examples, the initial event is defined as the first event represented in a set of cumulative audience metrics and event-level audience metrics, and the target event is initially defined as the second event. The instructions of FIG. 4 may loop back to block 405, especially after completing the tests defined in blocks 410, 420, 430, and 440 for the initial event and currently defined target event. After looping back to block 405, the data verifier circuitry 240 may select the next event as the current target event (e.g., the data verifier circuitry 240 may initially select event 1 as the initial event and event 2 as the target event, and upon looping back to block 405, select event 3 as the target event, and continue selecting target events as the current target event until all events have been selected and tested). In some examples, the data verifier circuitry 240 may select any combination of events as the initial event and target event so long as the initial event occurs before the target event in the set of cumulative audience metrics and event-level audience metrics.

After the data verifier circuitry 240 defines an initial event and current target event at block 405, control proceed to block 410 at which the data verifier circuitry 240 determines whether a particular one of the cumulative audience metrics associated with the current target event is less than a first limit corresponding to a largest one of the event-level audience metrics in a subset of the event-level audience metrics running from an initial event to the current target event. The processing at block 410 is based on the left-side of condition 1 described above. If the particular one of the cumulative audience metrics associated with the current target event is less than the largest one of the event-level audience metrics running from the initial event to the current target event, the data verifier circuitry 240 identifies an inconsistency. (Block 450).

In response to block 410 returning a result of NO, the example machine readable instructions 320 of FIG. 4 continue at block 420, at which the data verifier circuitry 240 determines whether the particular one of the cumulative audience metrics associated with the current target event is greater than a second limit corresponding to the smaller of (i) a sum of the event-level audience metrics associated with events ranging from the initial event to the current target event or (ii) a universe estimate of a population. The processing at block 420 is based on the right-side of condition 1 described above. If the particular one of the cumulative audience metrics associated with the current target event is greater than the smaller of (i) the sum of the event-level audience metrics associated with events ranging from the initial event to the current target event or (ii) the universe estimate of a population, the data verifier circuitry 240 identifies an inconsistency. (Block 450).

As used herein, a universe estimate of a population may be an estimation (e.g., an estimation generated by the audience metrics analyzer 120, the audience data provider 110, etc.) of the total possible number of unique audience members. In some examples, the universe estimate of a population is equal to a maximum possible cumulative audience that could be recorded in a set of cumulative audience metrics.

In response to block 420 returning a result of NO, the example machine readable instructions 320 of FIG. 4 continue at block 430, at which the data verifier circuitry 240 is to determine whether the particular one of the cumulative audience metrics associated with the current target event is less than a third limit corresponding to the one of the cumulative audience metrics associated with an event preceding the current target event. The processing at block 430 is based on the left-side of condition 2 described above. If the particular one of the cumulative audience metrics associated with the current target event is less than the one of the cumulative audience metrics associated with the preceding event of the current target event, the data verifier circuitry 240 identifies an inconsistency. (Block 450).

In response to block 430 returning a result of NO, the example machine readable instructions 320 of FIG. 4 continue at block 440, at which the data verifier circuitry 240 is to determine whether a difference between the particular one of the cumulative audience metrics associated with the current target event and the one of the cumulative audience metrics associated with the event preceding the current target event is greater than a fourth limit corresponding to a one of the event-level audience metrics associated with the current target event. The processing at block 440 is based on the right-side of condition 2 described above. If the difference between the particular one of the cumulative audience metrics associated with the current target event and the one of the cumulative audience metrics associated with the preceding event of the current target event is greater than the one of the event-level audience metrics associated with the current target event, the data verifier circuitry 240 identifies an inconsistency. (Block 450).

In response to the blocks 410, 420, 430, and/or 440 returning a result of YES (e.g., blocks 410, 420, 430, and/or 440 return a result of YES), the example audience metrics analyzer 120 identifies an inconsistency in the measured audience data. (Block 450). The detected inconsistency is in at least one of the first set of cumulative audience metrics or the second set of event-level audience metrics. At block 450, instructions may be sent to the report generator circuitry 250 to generate a report of the inconsistency. In other examples, the data verifier circuitry 240 identifying an inconsistency in audience measurement data causes the communication interface circuitry 210, report generator circuitry 250, and/or more generally the audience measurement entity 102 to cause some other action to take place, including stopping processing of data, starting an alarm or notification, triggering some other downstream event, etc. In some examples, control will proceed to run all of the tests represented by blocks 410, 420, 430, and 440, even if one of the tests has already returned a result of YES, indicating an inconsistency. In this way, the audience metrics analyzer 120 is able to identify multiple inconsistencies in the audience measurement data. In addition, in some examples, the tests represented by 410, 420, 430, and/or 440 completed by the audience metrics analyzer 120 may be performed in a different order, with any variation of tests. In some examples, upon any one of the tests represented by blocks 410, 420, 430, and 440 returning a result of YES, indicating an inconsistency, control immediately proceeds to block 450, and the other tests may not be performed to identify an inconsistency in the audience measurement data. In yet other examples, the tests represented by blocks 410, 420, 430, and/or 440 may be completed by the data verifier circuitry 240 simultaneously and without any particular defined order (e.g., all tests may be processed substantially at the same time, without any particular defined order). In other examples, a setting, configuration, and/or other instruction received or stored by the audience metrics analyzer 120, including by way of the audience measurement entity 102, may cause the data verifier circuitry 240 to perform only a select number of the tests represented by 410, 420, 430, and/or 440 (e.g., only the test at block 410 could be performed, alone or in combination with any other test to be performed by the data verifier circuitry 240, etc.).

In response to blocks 410, 420, 430, and 440 returning a result of NO, the audience metrics analyzer 120 does not identify an inconsistency in the audience measurement data. (Block 460). In other examples, wherein the data verifier circuitry 240 is only configured or otherwise instructed to perform a select number of the tests represented by blocks 410, 420, 430, and/or 440, the data verifier circuitry may proceed to block 460 upon completing the selected tests.

In response to identifying an inconsistency in the audience measurement data (block 450) or not identifying an inconsistency in the audience measurement data (block 460), the data verifier circuitry 240 determines if analysis is complete. (Block 470). In some examples, the data verifier circuitry 240 determines that analysis is complete if the data verifier circuitry 240 has iterated through all events in the set of cumulative audience metrics and event-level audience metrics (e.g., the data verifier circuitry 240 has completed the tests defined at blocks 410, 420, 430, and/or 440 for all events, wherein all events represented were defined as target events). In some examples, the data verifier circuitry 240 determines that analysis is complete if an inconsistency is identified. In some examples, the data verifier circuitry 240 determines that analysis is complete if the data verifier circuitry 240 has completed a threshold number of tests (e.g., if the threshold number of target events to tests is 100, the data verifier circuitry 240 may determine analysis is complete upon completing tests with 100 different target events selected). In some examples, the data verifier circuitry 240 may determine that analysis is complete if the memory 230 can no longer process additional tests. In some examples, the data verifier circuitry 240 may determine that analysis is complete if a threshold number of inconsistencies is identified (e.g., if the threshold number of inconsistencies is 10, the data verifier circuitry 240 may determine analysis is complete upon identifying 10 inconsistencies among the completed tests.) In yet other examples, any other setting, configuration, or threshold may cause the data verifier circuitry 240 to determine that analysis is complete, including but not limited to the operations of the audience metrics analyzer 120 being terminated for any reason.

The example tables of FIG. 5a and FIG. 5b demonstrate the relationship between a set of event-level audience metrics and a corresponding set of cumulative audience metrics. In some examples, the events may correspond to time periods, which may or may not be evenly spaced apart. In some examples, the events are separated by some other feature distinguishing a difference between different event-level metrics. In some examples, the feature(s) distinguishing a difference between different event-level metrics are episodes of a series of a TV show, movies in a movie series, advertisements in an advertisement series, broadcasts in a broadcast series, etc. In this example, event-level metrics could correspond to TV episodes in a TV series, movies in a movie series, an advertisement that is part of a series of separate advertisements, a broadcast that is part of a series of broadcasts, etc. For example, a TV series consisting of 10 episodes could measure or estimate event-level audience metrics representing audience members who have recorded an impression or impressions to each episode (e.g., an event-level metric of 100 at event 1 represents 100 media impressions recorded for episode 1 of the TV series, etc.). In some examples, the feature(s) distinguishing a difference between different event-level metrics are different showings of episodes of a TV show, movie, advertisement, broadcast, etc. For example, data verifier circuitry 240 may record event-level audience metrics and cumulative audience metrics at each of 5 different times for a TV show scheduled at 5 different times, each of these 5 different times corresponding to a different event.

In FIG. 5a, set 1 (cumulative audience metrics) 502 includes five cumulative audience metrics. These five cumulative audience metrics include metrics associated with event #1 510, event #2 512, event #3 514, event #4 516, and event #5 518. The five cumulative audience metrics of FIG. 5a include a first cumulative audience metric 520, a second cumulative audience metric 522, a third cumulative audience metric 524, a fourth cumulative audience metric 526, and a fifth cumulative audience metric 528. In the example of FIG. 5a, the first cumulative audience metric 520 is equal to 16, the second cumulative audience metric 522 is equal to 52, the third cumulative audience metric 524 is equal to 60, the fourth cumulative audience metric 526 is equal to 49, and the fifth cumulative audience metric 528 is equal to 89.

In FIG. 5a, set 2 (event-level audience metrics) 504 includes five event-level audience metrics. These five event-level audience metrics include metrics associated with event #1 510, event #2 512, event #3 514, event #4 516, and event #5 518. The five event-level audience metrics of FIG. 5a include a first event-level audience metric 530, a second event-level audience metric 532, a third event-level audience metric 534, a fourth event-level audience metric 536, and a fifth event-level audience metric 538. In the example of FIG. 5a, the first event-level audience metric 530 is equal to 16, the second event-level audience metric 532 is equal to 48, the third event-level audience metric 534 is equal to 5, the fourth event-level audience metric 536 is equal to 11, and the fifth event-level audience metric 538 is equal to 64.

In FIG. 5b, set 1 (cumulative audience metrics) 542 includes five cumulative audience metrics. These five cumulative audience metrics include metrics associated with event #1 550, event #2 552, event #3 554, event #4 556, and event #5 558. The five cumulative audience metrics of FIG. 5b include a first cumulative audience metric 560, a second cumulative audience metric 562, a third cumulative audience metric 564, a fourth cumulative audience metric 566, and a fifth cumulative audience metric 568. In the example of FIG. 5b, the first cumulative audience metric 560 is equal to 16, the second cumulative audience metric 562 is equal to 51, the third cumulative audience metric 564 is equal to 52, the fourth cumulative audience metric 566 is equal to 55, and the fifth cumulative audience metric 568 is equal to 142.

In FIG. 5b, set 2 (event-level audience metrics) 544 includes five event-level audience metrics. These five event-level audience metrics include metrics associated with event #1 550, event #2 552, event #3 554, event #4 556, and event #5 558. The five event-level audience metrics of FIG. 5b include a first event-level audience metric 570, a second event-level audience metric 572, a third event-level audience metric 574, a fourth event-level audience metric 576, and a fifth event-level audience metric 578. In the example of FIG. 5b, the first event-level audience metric 570 is equal to 16, the second event-level audience metric 572 is equal to 48, the third event-level audience metric 574 is equal to 5, the fourth event-level audience metric 576 is equal to 11, and the fifth event-level audience metric 578 is equal to 64.

For example, in FIG. 5a, at event #1 510, the first cumulative audience metric 520 is equal to 16. In the example, 16 is the cumulative total of unique audience members who have recorded an impression to a media up to and including event #1 510. At event #1 510, the first event-level audience metric 530 is equal to 16. This represents the number of deduplicated media impressions recorded at that event. For example, the cumulative audience metric at event #2 512 is equal to 52, representing that the cumulative unique audience from event #1 510 up to and including event #2 512 is equal to 52. In another example, the cumulative audience metric at event #3 514 is equal to 60, representing that the cumulative unique audience from event #1 510, event #2 512, and event #3 514 is equal to 60.

The example table of FIG. 5a demonstrates set 1 (cumulative audience metrics) 502 and set 2 (event-level audience metrics) 504 that can be used to demonstrate tests performed by the data verifier circuitry 240 to identify inconsistencies in the audience measurement data.

In one example, the instructions of FIG. 4 begin at block 405, at which the data verifier circuitry 240 defines an initial event and a target event. In this particular example, event #1 510 is the initial event, and event #4 516 is the target event. At block 410, the data verifier circuitry 240 would identify that the fourth cumulative audience metric 526 equal to 49 is not less than any of the first event-level audience metric 530 equal to 16, the second event-level audience metric 532 equal to 48, the third event-level audience metric 534 equal to 5, or the fourth event-level audience metric 536 equal to 11, and therefore block 410 returns a result of NO after this example test. At block 420, in an example where a universe estimate of a population is 1,000 audience members, the data verifier circuitry 240 would identify that the fourth cumulative audience metric 526 equal to 49 is not greater than the first event-level audience metric 530 equal to 16 plus the second event-level audience metric 532 equal to 48 plus the third event-level audience metric 534 equal to 5 plus the fourth event-level audience metric 536 equal to 11, and that the fourth cumulative audience metric 526 equal to 49 is not greater than 1,000, and therefore returns a result of NO at block 420. However, at block 430, the data verifier circuitry 240 would identify that the fourth cumulative audience metric 526 equal to 49 is less than the third cumulative audience metric 524 equal to 60, and therefore block 430 returns a result of YES after this example test. This would be identified as an inconsistency because total unique audience at a target event cannot decrease from the unique audience associated with a preceding event of the target event.

In another example, event #1 510 is the initial event, and event #3 514 is the target event. At block 430, the data verifier circuitry 240 would identify that the third cumulative audience metric 524 equal to 60 is greater than the second cumulative audience metric 522 equal to 52, and therefore block 430 returns a result of NO after this example test. At block 440, however, the data verifier circuitry 240 would identify that the third cumulative audience metric 524 equal to 60 minus the second cumulative audience metric 522 equal to 52 is greater than the third event-level audience metric 534 equal to 5, and therefore returns a result of YES at block 440. This would be identified as an inconsistency because total unique audience at the target event cannot increase from the unique audience at the preceding event of the target event more than the event-level metric corresponding to the target event.

The example table of FIG. 5b demonstrates set 1 (cumulative audience metrics) 542 and set 2 (event-level audience metrics) 544 that can be used to demonstrate tests performed by the data verifier circuitry 240 to identify inconsistencies in the audience measurement data.

In one example, the instructions of FIG. 4 begin at block 405, at which the data verifier circuitry 240 defines an initial event and a target event. In this particular example, event #1 550 is the initial event, and event #5 558 is the target event. At block 410, the data verifier circuitry 240 would identify that the fifth cumulative audience metric 568 equal to 142 is not less than any of the first event-level audience metric 570 equal to 16, the second event-level audience metric 572 equal to 48, the third event-level audience metric 574 equal to 5, the fourth event-level audience metric 576 equal to 11, or the fifth event-level audience metric 578 equal to 64, and therefore block 410 returns a result of NO after this example test. At block 420, in an example where a universe estimate of the population is 1,000, the data verifier circuitry 240 would identify that the fifth cumulative audience metric 568 equal to 142 is not greater than the first event-level audience metric 570 equal to 16 plus the second event-level audience metric 572 equal to 48 plus the third event-level audience metric 574 equal to 5 plus the fourth event-level audience metric 576 equal to 11 plus the fifth event-level audience metric 578 equal to 64, and that the fifth cumulative audience metric 568 equal to 142 is not greater than 1,000, and therefore returns a result of NO at block 420. At block 430, the data verifier circuitry 240 would identify that the fifth cumulative audience metric 568 equal to 142 is not less than the fourth cumulative audience 566 equal to 55, and therefore block 430 returns a result of NO after this example test. However, at block 440, the data verifier circuitry 240 would identify that the fifth cumulative audience metric 568 equal to 142 minus the fourth cumulative audience metric 566 equal to 55 is greater than the fifth event-level audience metric 578 equal to 64, and therefore returns a result of YES at block 440. This would be identified as an inconsistency because total unique audience at the target event cannot increase from the unique audience at the preceding event of the target event more than the event-level metric corresponding to the target event.

Figure 6:
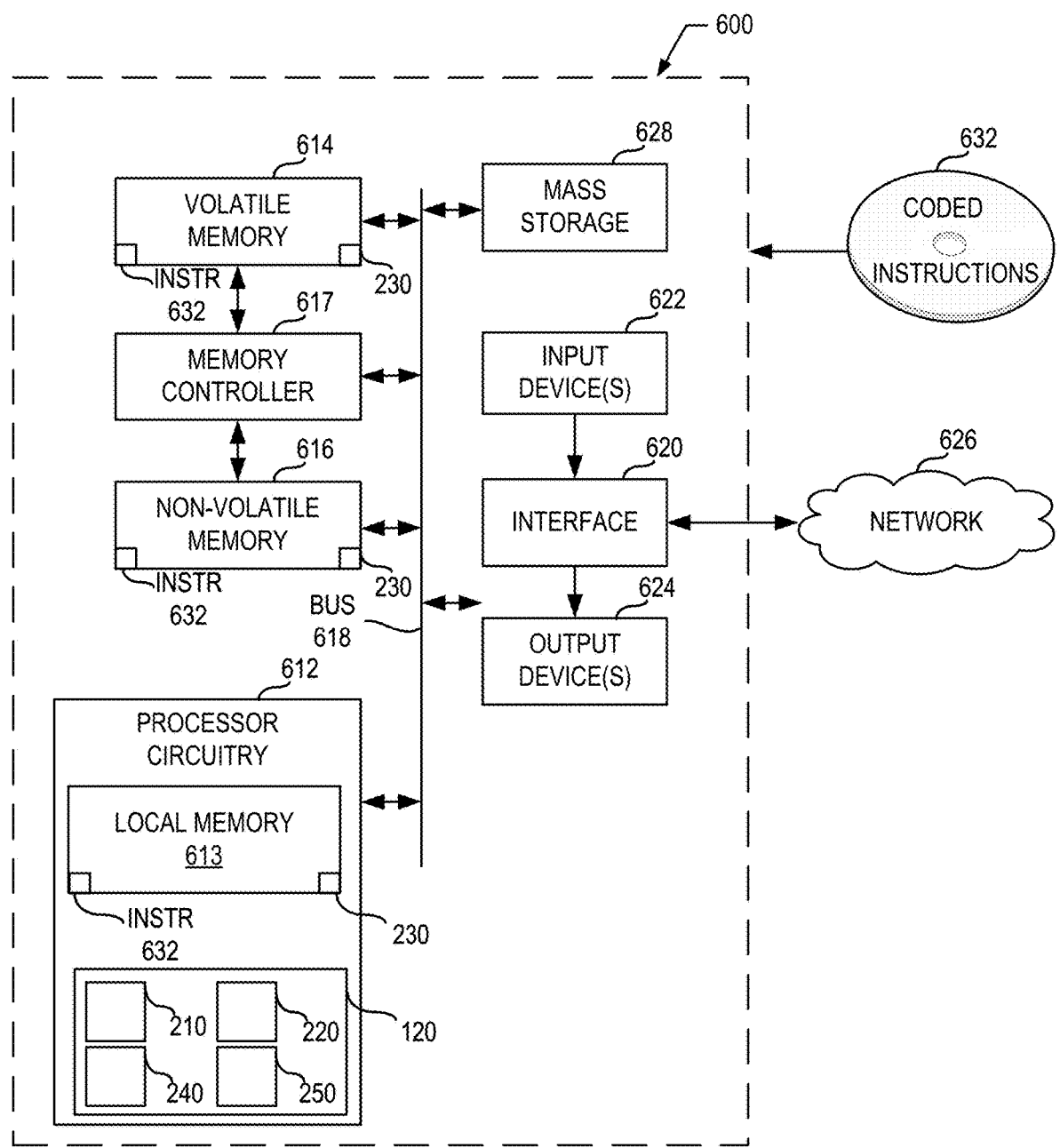
FIG. 6 is a block diagram of an example processing platform including processor circuitry structured to execute the example machine readable instructions and/or the example operations of FIGS. 3 and/or 4 to implement the audience metrics analyzer of FIG. 2.

FIG. 6 is a block diagram of an example processor platform 600 structured to execute and/or instantiate the machine readable instructions and/or the operations of FIGS. 3 and 4 to implement the audience metrics analyzer 120 of FIGS. 1 and 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example audience metrics analyzer 120, the example communications interface circuitry 210, the example audience metrics interpreter circuitry 220, the example data verifier 240, and the example report generator circuitry 250.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 632, which may be implemented by the machine readable instructions of FIGS. 3 and/or 4, may be stored in the mass storage device 628, in the volatile memory 614, in the non-volatile memory 616, and/or on a removable non-transitory computer readable storage medium such as a CD or DVD.

Figure 7:
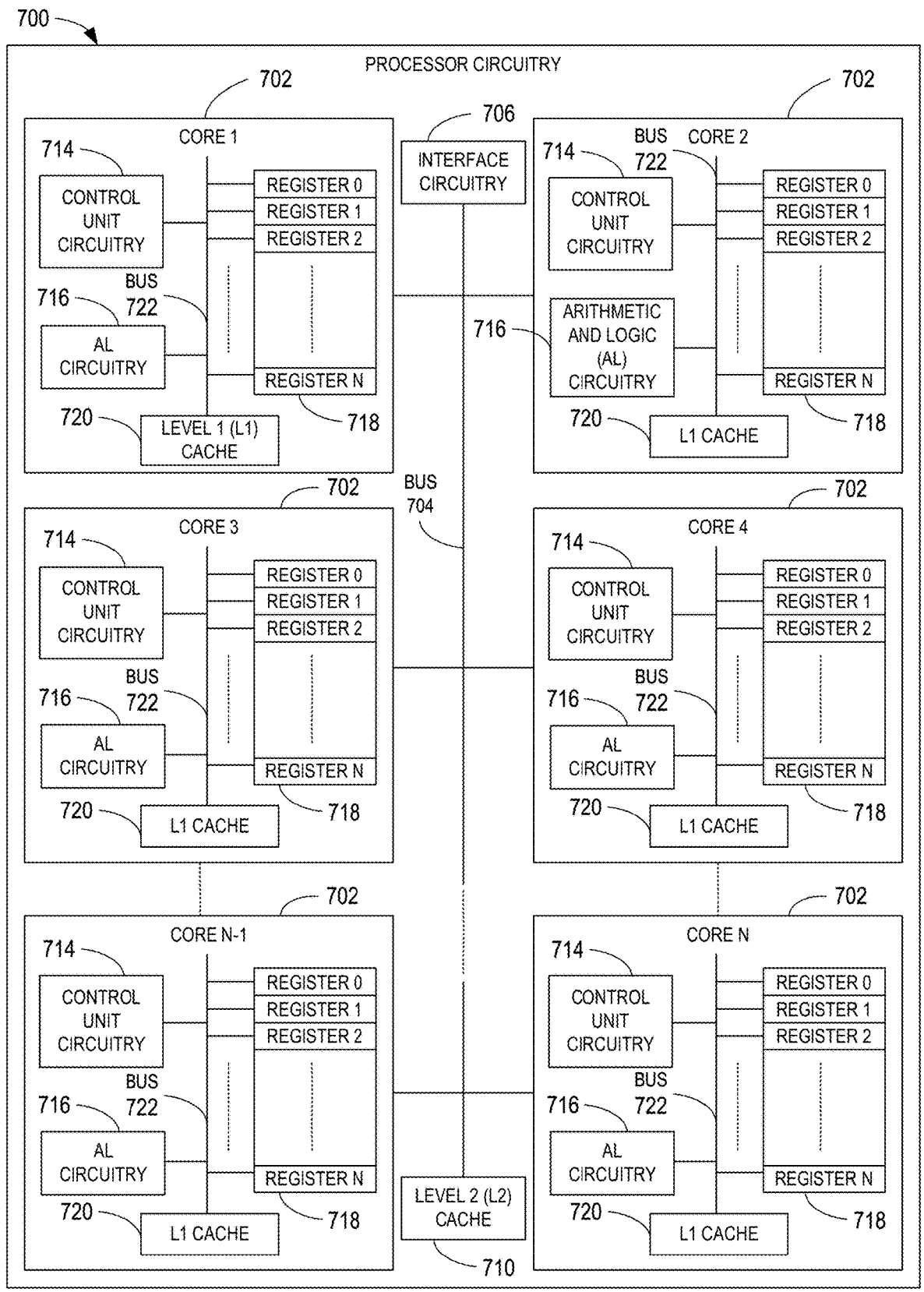
FIG. 7 is a block diagram of an example implementation of the processor circuitry of FIG. 5.

FIG. 7 is a block diagram of an example implementation of the processor circuitry 612 of FIG. 6. In this example, the processor circuitry 612 of FIG. 6 is implemented by a microprocessor 700. For example, the microprocessor 700 may be a general purpose microprocessor (e.g., general purpose microprocessor circuitry). The microprocessor 700 executes some or all of the machine readable instructions of the flowchart of FIGS. 3 and/or 4 to effectively instantiate the circuitry of FIG. 2 as logic circuits to perform the operations corresponding to those machine readable instructions. In some such examples, the circuitry of FIG. 2 is instantiated by the hardware circuits of the microprocessor 700 in combination with the instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIGS. 3 and/or 4.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The second bus 722 may be implemented by at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
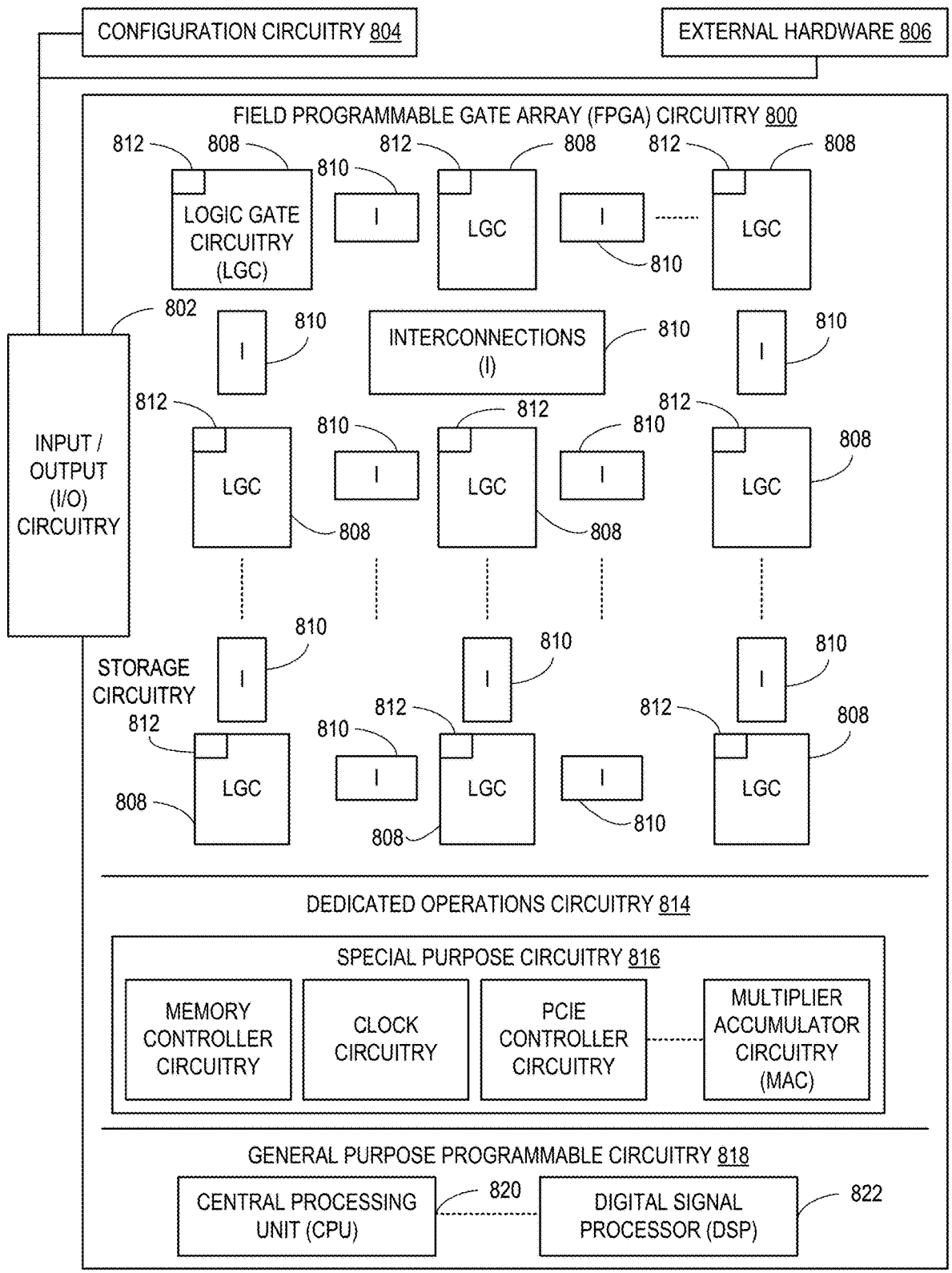
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowcharts of FIGS. 3 and 4 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowcharts of FIGS. 3 and 4. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowcharts of FIGS. 3 and 4. As such, the FPGA circuitry 800 may be structured to effectively instantiate some or all of the machine readable instructions of the flowcharts of FIGS. 3 and 4 as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 3 and 4 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may be implemented by external hardware circuitry. For example, the external hardware 806 may be implemented by the microprocessor 700 of FIG. 7. The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations that may correspond to at least some of the machine readable instructions of FIGS. 3 and 4 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an onboard CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowcharts of FIGS. 3 and 4 may be executed by one or more of the cores 702 of FIG. 7, a second portion of the machine readable instructions represented by the flowcharts of FIGS. 3 and 4 may be executed by the FPGA circuitry 800 of FIG. 8, and/or a third portion of the machine readable instructions represented by the flowchart of FIGS. 3 and 4 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
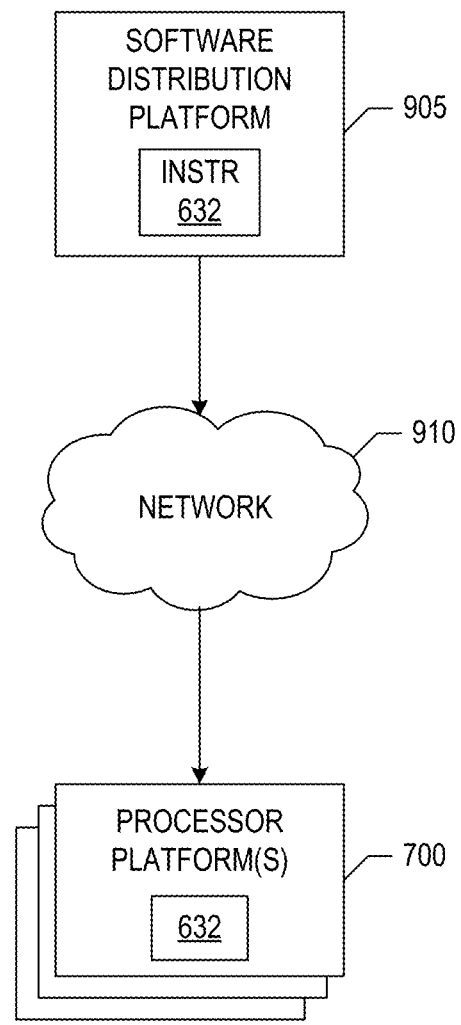
FIG. 9 is a block diagram of an example software distribution platform (e.g., one or more servers) to distribute software (e.g., software corresponding to the example machine readable instructions of FIGS. 3 and 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions 300 and 400 of FIGS. 3 and 4, as described above. The one or more servers of the example software distribution platform 905 are in communication with an example network 910, which may correspond to any one or more of the Internet and/or any of the example networks, including network 626 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 300 and 400 of FIGS. 3 and 4, may be downloaded to the example processor platform 600, which is to execute the machine readable instructions 632 to implement the audience metrics analyzer 120. In some examples, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that example systems, methods, apparatus, and articles of manufacture have been disclosed that identify inconsistencies in audience measurement data. Disclosed systems, methods, apparatus, and articles of manufacture improve a computing device by triggering an alarm and/or warning to indicate a detected inconsistency. In some examples, this alarm and/or warning is communicated to a party interested in detecting an inconsistency in the audience measurement data. For example, such communication can be via email, SMS message, mobile application notification, automated phone call, etc., or any combination thereof. In some examples, this communication includes details regarding the nature of the detected inconsistency. In some examples, in response to detecting an inconsistency, disclosed systems, methods, apparatus, and articles of manufacture cause a downstream process to stop processing data. In some examples, this data is audience measurement data. In some examples, disclosed systems, methods, apparatus, and articles of manufacture send a message or assert a trigger for a process to stop collecting, estimating, or otherwise processing audience measurement data in response to detecting an inconsistency. In some examples, the trigger to stop processing data in response to detecting an inconsistency is to preserve computing resources. In the example including the trigger, this could allow the process increased computing efficiency with other tasks, including collecting and/or estimating other data sets.

Accordingly, disclosed systems, methods, apparatus, and articles of manufacture are accordingly directed to one or more improvement(s) in the operation of a machine such as a computer or other electronic and/or mechanical device.

Although certain example methods, apparatus, and articles of manufacture have been disclosed herein, the scope of coverage of this patent is not limited hereto. On the contrary, this patent covers all methods, apparatus, and articles of manufacture fairly falling within the scope of the claims of this patent.

Example methods, apparatus, systems, and articles of manufacture to identify inconsistencies in audience measurement data are disclosed herein. Further examples and combinations thereof include the following:

Example 1 includes an apparatus comprising at least one memory, machine readable instructions, and processor circuitry to at least one of instantiate or execute the machine readable instructions to at least compare ones of a first set of cumulative audience metrics with one or more limits based on a second set of event-level audience metrics to detect an inconsistency in at least one of the first set of cumulative audience metrics or the second set of event-level audience metrics, and generate a report of the inconsistency in the at least one of the first set of event-level audience metrics or the second set of cumulative audience metrics.

Example 2 includes the apparatus of example 1, wherein the cumulative audience metrics in the first set are associated respectively with a corresponding set of events from an initial event to a target event, the event-level audience metrics in the second set are associated respectively with the corresponding set of events from the initial event to the target event, and the processor circuitry is to detect the inconsistency in response to a first one of the cumulative audience metrics associated with the target event being less than a largest one of the event-level audience metrics from the initial event to the target event in the second set.

Example 3 includes the apparatus of example 1, wherein the cumulative audience metrics in the first set are associated respectively with a corresponding set of events from an initial event to a target event, the event-level audience metrics in the second set are associated respectively with the corresponding set of events from the initial event to the target event, and wherein the processor circuitry is to detect the inconsistency in response to a first one of the cumulative audience metrics associated with the target event being greater than a limit.

Example 4 includes the apparatus of example 3, wherein the limit corresponds to a smaller of (i) a sum of event-level audience metrics associated with events ranging from the initial event to the target event in the second set or (ii) a universe estimate of a population.

Example 5 includes the apparatus of example 1, wherein the cumulative audience metrics in the first set are associated respectively with a corresponding set of events from an initial event to a target event, and the processor circuitry is to detect the inconsistency in response to a first one of the cumulative audience metrics associated with the target event being less than a second one of the cumulative audience metrics associated with a preceding event relative to the target event.

Example 6 includes the apparatus of example 1, wherein the cumulative audience metrics in the first set are associated respectively with a corresponding set of events from an initial event to a target event, the event-level audience metrics in the second set are associated respectively with the corresponding set of events from the initial event to the target event, and the processor circuitry is to detect the inconsistency in response to a difference between a first one of the cumulative audience metrics and a second one of the cumulative audience metrics being greater than a third one of the event-level audience metrics associated with the target event, the first one of the cumulative audience metrics associated with the target event, the second one of the cumulative audience metrics associated with a preceding event relative to the target event.

Example 7 includes the apparatus of example 1, wherein the processor circuitry is to send an instruction to stop data processing by an audience data provider in response to detecting the inconsistency.

Example 8 includes a non-transitory computer readable medium comprising instructions which, when executed, cause a processor to at least compare ones of a first set of cumulative audience metrics with one or more limits based on a second set of event-level audience metrics to detect an inconsistency in at least one of the first set of cumulative audience metrics or the second set of event-level audience metrics, and generate a report of the inconsistency in the at least one of the first set of event-level audience metrics or the second set of cumulative audience metrics.

Example 9 includes the non-transitory computer readable medium of example 8, wherein the cumulative audience metrics in the first set are associated respectively with a corresponding set of events from an initial event to a target event, the event-level audience metrics in the second set are associated respectively with the corresponding set of events from the initial event to the target event, and the instructions are to cause the processor to detect the inconsistency in response to a first one of the cumulative audience metrics associated with the target event being less than a largest one of the event-level audience metrics in the second set.

Example 10 includes the non-transitory computer readable medium of example 8, wherein the cumulative audience metrics in the first set are associated respectively with a corresponding set of events from an initial event to a target event, the event-level audience metrics in the second set are associated respectively with the corresponding set of events from the initial event to the target event, and wherein the instructions are to cause the processor to detect the inconsistency in response to a first one of the cumulative audience metrics associated with the target event being greater than a limit.

Example 11 includes the non-transitory computer readable medium of example 10, wherein the limit corresponds to a smaller of (i) a sum of event-level audience metrics associated with events ranging from the initial event to the target event in the second set or (ii) a universe estimate of a population.

Example 12 includes the non-transitory computer readable medium of example 8, wherein the cumulative audience metrics in the first set are associated respectively with a corresponding set of events from an initial event to a target event, and wherein the instructions are to cause the processor to detect the inconsistency in response to a first one of the cumulative audience metrics associated with the target event being less than a second one of the cumulative audience metrics associated with a preceding event relative to the target event.

Example 13 includes the non-transitory computer readable medium of example 8, wherein the cumulative audience metrics in the first set are associated respectively with a corresponding set of events from an initial event to a target event, the event-level audience metrics in the second set are associated respectively with the corresponding set of events from the initial event to the target event, and wherein the instructions are to cause the processor to detect the inconsistency in response to a difference between a first one of the cumulative audience metrics and a second one of the cumulative audience metrics being greater than a third one of the event-level audience metrics associated with the target event, the first one of the cumulative audience metrics associated with the target event, the second one of the cumulative audience metrics associated with a preceding event relative to the target event.

Example 14 includes the non-transitory computer readable medium of example 13, wherein the processor is to send an instruction to stop data processing by an audience data provider in response to detecting the inconsistency.

Example 15 includes a method comprising comparing ones of a first set of cumulative audience metrics with one or more limits based on a second set of event-level audience metrics to detect an inconsistency in at least one of the first set of cumulative audience metrics or the second set of event-level audience metrics, and generating a report of the inconsistency in the at least one of the first set of event-level audience metrics or the second set of cumulative audience metrics.

Example 16 includes the method of example 15, wherein the cumulative audience metrics in the first set are associated respectively with a corresponding set of events from an initial event to a target event, the event-level audience metrics in the second set are associated respectively with the corresponding set of events from the initial event to the target event, further including detecting the inconsistency in response to a first one of the cumulative audience metrics associated with the target event being less than a largest one of the event-level audience metrics in the second set.

Example 17 includes the method of example 15, wherein the cumulative audience metrics in the first set are associated respectively with a corresponding set of events from an initial event to a target event, the event-level audience metrics in the second set are associated respectively with the corresponding set of events from the initial event to the target event, including detecting the inconsistency in response to a first one of the cumulative audience metrics associated with the target event being greater than a limit.

Example 18 includes the method of example 17, wherein the limit corresponds to a smaller of (i) a sum of event-level audience metrics associated with events ranging from the initial event to the target event in the second set or (ii) a universe estimate of a population.

Example 19 includes the method of example 15, wherein the cumulative audience metrics in the first set are associated respectively with a corresponding set of events from an initial event to a target event, and further including detecting the inconsistency in response to a first one of the cumulative audience metrics associated with the target event being less than a second one of the cumulative audience metrics associated with a preceding event relative to the target event.

Example 20 includes the method of example 15, wherein the cumulative audience metrics in the first set are associated respectively with a corresponding set of events from an initial event to a target event, the event-level audience metrics in the second set are associated respectively with the corresponding set of events from the initial event to the target event, further including detecting the inconsistency in response to a difference between a first one of the cumulative audience metrics and a second one of the cumulative audience metrics being greater than a third one of the event-level audience metrics associated with the target event, the first one of the cumulative audience metrics associated with the target event, the second one of the cumulative audience metrics associated with a preceding event relative to the target event.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A computing system comprising:
   a processor; and
   a non-transitory computer-readable storage medium, having stored thereon program instructions that, upon execution by the processor, cause performance of a set of operations comprising:
      obtaining, at a server associated with an audience measurement entity, audience measurement data corresponding to a plurality of media devices;
      determining, using the audience measurement data, a set of cumulative audience metrics and a set of event-level audience metrics,
         wherein the set of event-level audience metrics corresponds to metrics associated with media impressions corresponding respectively to a series of events, and
         wherein the set of cumulative audience metrics corresponds to metrics associated with a cumulative number of unique users having accessed media at the same series of events;
      comparing ones of the set of cumulative audience metrics with one or more limits based on the set of event-level audience metrics at a corresponding event of the series of events to detect one or more inconsistencies in at least one of the set of cumulative audience metrics or the set of event-level audience metrics;
      detecting an inconsistency of the one or more inconsistencies based on a difference between a first cumulative audience metric of the set of cumulative audience metrics and a second cumulative audience metric of the set of cumulative audience metrics being greater than an event-level audience metric of the set of event-level audience metrics associated with a target event of the series of events,
         wherein the first cumulative audience metric is associated with the target event, and
         wherein the second cumulative audience metric is associated with a preceding event relative to the target event; and
      causing, in response to detecting the inconsistency of the one or more inconsistencies, the server of the audience measurement entity to stop processing the audience measurement data thereby reducing computational resources associated with the server processing the audience measurement data.

2. The computing system of claim 1, wherein the set of operations further comprise detecting another inconsistency of the one or more inconsistencies in response to a third cumulative audience metric of the set of cumulative audience metrics associated with the target event being greater than a largest event-level audience metric of the set of event-level audience metrics.

3. The computing system of claim 1, wherein the set of operations further comprise detecting another inconsistency of the one or more inconsistencies in response to a third cumulative audience metric of the set of cumulative audience metrics associated with the target event being greater than a limit.

4. The computing system of claim 3, wherein the limit corresponds to a smaller of (i) a sum of event-level audience metrics associated with events ranging from an initial event to the target event in the set of event-level audience metrics or (ii) a universe estimate of a population.

5. The computing system of claim 4, wherein the universe estimate of the population is an estimate of a total audience that could be exposed to a particular media.

6. The computing system of claim 1, wherein the set of operations further comprise detecting another inconsistency of the one or more inconsistencies in response to a third cumulative audience metric of the set of cumulative audience metrics associated with the target event being less than a fourth cumulative audience metric of the set of cumulative audience metrics associated with a preceding event relative to the target event.

7. The computing system of claim 1, wherein the causing, in response to detecting the inconsistency of the one or more inconsistencies, the server of the audience measurement entity to stop processing the audience measurement data further comprises sending an instruction to an audience data provider to stop collecting the audience measurement data, wherein the audience measurement data is obtained from the audience data provider.

8. The computing system of claim 1, wherein the set of operations further comprise triggering an alert based on the detecting the inconsistency.

9. The computing system of claim 8, wherein the triggering the alert comprises transmitting the alert to a mobile device.

10. A non-transitory computer-readable storage medium, having stored thereon program instructions which, when executed, cause a processor to perform a set of operations:
   obtaining, at a server associated with an audience measurement entity, audience measurement data corresponding to a plurality of media devices;
   determining, using the audience measurement data, a set of cumulative audience metrics and a set of event-level audience metrics,
      wherein the set of event-level audience metrics corresponds to metrics associated with media impressions corresponding respectively to a series of events, and wherein the set of cumulative audience metrics corresponds to metrics associated with a cumulative number of unique users having accessed media at the same series of events;

comparing ones of the set of cumulative audience metrics with one or more limits based on the set of event-level audience metrics at a corresponding event of the series of events to detect one or more inconsistencies in at least one of the set of cumulative audience metrics or the set of event-level audience metrics;

detecting an inconsistency of the one or more inconsistencies based on a difference between a first cumulative audience metric of the set of cumulative audience metrics and a second cumulative audience metric of the set of cumulative audience metrics being greater than an event-level audience metric of the set of event-level audience metrics associated with a target event of the series of events,
wherein the first cumulative audience metric is associated with the target event, and
wherein the second cumulative audience metric is associated with a preceding event relative to the target event;

generating, after the detecting, a report of the inconsistency of the one or more inconsistencies; and causing, in response to detecting the inconsistency of the one or more inconsistencies, the server of the audience measurement entity to stop processing the audience measurement data thereby reducing computational resources associated with the server processing the audience measurement data.

11. The non-transitory computer-readable storage medium of claim 10, wherein the set of operations further comprise detecting another inconsistency of the one or more inconsistencies in response to a third cumulative audience metric of the set of cumulative audience metrics associated with the target event being less than a largest event-level audience metric of the set of event-level audience metrics.

12. The non-transitory computer-readable storage medium of claim 10, wherein the set of operations further comprise detecting another inconsistency of the one or more inconsistencies in response to a third cumulative audience metric of the set of cumulative audience metrics associated with the target event being greater than a limit.

13. The non-transitory computer-readable storage medium of claim 12, wherein the limit corresponds to a smaller of (i) a sum of event-level audience metrics associated with events ranging from an initial event to the target event in the set of event-level audience metrics or (ii) a universe estimate of a population.

14. The non-transitory computer-readable storage medium of claim 10, wherein the set of operations further comprise detecting another inconsistency of the one or more inconsistencies in response to a third cumulative audience metric of the set of cumulative audience metrics associated with the target event being greater than a fourth cumulative audience metric of the set of cumulative audience metrics associated with a preceding event relative to the target event.

15. The non-transitory computer-readable storage medium of claim 8, wherein the set of operations further comprise transmitting, in response to the generating, a message to a computing device, the message including the report of the inconsistency of the one or more inconsistencies.

16. A method comprising:
obtaining, at a server associated with an audience measurement entity, audience measurement data corresponding to a plurality of media devices, wherein the audience measurement data is obtained from an audience data provider;

determining, using the audience measurement data, a set of cumulative audience metrics and a set of event-level audience metrics,
wherein the set of event-level audience metrics corresponds to metrics associated with media impressions corresponding respectively to a series of events, and
wherein the set of cumulative audience metrics corresponds to metrics associated with a cumulative number of unique users having accessed media at the same series of events;

comparing ones of the set of cumulative audience metrics with one or more limits based on the set of event-level audience metrics at a corresponding event of the series of events to detect one or more inconsistencies in at least one of the set of cumulative audience metrics or the set of event-level audience metrics;

detecting an inconsistency of the one or more inconsistencies based on a difference between a first cumulative audience metric of the set of cumulative audience metrics and a second cumulative audience metric of the set of cumulative audience metrics being greater than an event-level audience metric of the set of event-level audience metrics associated with a target event of the series of events,
wherein the first cumulative audience metric is associated with the target event, and
wherein the second cumulative audience metric is associated with a preceding event relative to the target event;

causing, in response to detecting the inconsistency of the one or more inconsistencies, the server of the audience measurement entity to stop processing the audience measurement data thereby reducing computational resources; and transmitting, in response to detecting the inconsistency of the one or more inconsistencies, an alert to a computing device of the audience data provider to report the inconsistency of the one or more inconsistencies.

17. The method of claim 16, further comprising detecting another inconsistency in response to a third cumulative audience metrics of the set of cumulative audience metrics associated with the target event being less than a largest event-level audience metric of the set of event-level audience metrics.

18. The method of claim 16, further comprising detecting another inconsistency of the one or more inconsistencies in response to a third cumulative audience metric of the set of cumulative audience metrics associated with the target event being greater than a limit.

19. The method of claim 18, wherein the limit corresponds to a smaller of (i) a sum of event-level audience metrics associated with events ranging from an initial event to the target event in the set of event-level audience metrics or (ii) a universe estimate of a population.

20. The method of claim 16, further comprising detecting another inconsistency of the one or more inconsistencies in response to a third cumulative audience metric of the set of cumulative audience metrics associated with the target event being greater than a fourth cumulative audience metric of the set of cumulative audience metrics associated with a preceding event relative to the target event.

* * * * *